United States Patent [19]

Osborne

[11] 4,008,488

[45] Feb. 15, 1977

[54] MAGNETIC RECORDING DATA DECODING SYSTEM

[75] Inventor: George T. Osborne, Rush City, Minn.

[73] Assignee: Braemar Computer Devices, Inc., Burnsville, Minn.

[22] Filed: Aug. 25, 1975

[21] Appl. No.: 607,351

[52] U.S. Cl. ............................................. 360/51
[51] Int. Cl.² ........................................ G11B 5/02
[58] Field of Search .................. 360/51, 41, 27

[56] References Cited

UNITED STATES PATENTS

| 3,195,118 | 7/1965 | St. Clair | 360/51 |
| 3,736,581 | 5/1973 | Breikss | 360/51 |
| 3,765,005 | 10/1973 | Cannon | 360/51 |
| 3,810,235 | 5/1974 | Hopkins et al. | 360/51 |

*Primary Examiner*—Vincent P. Canney
*Attorney, Agent, or Firm*—Weingarten, Maxham & Schurgin

[57] ABSTRACT

For use with a magnetic data recording having one or more data tracks and a clock track, a decoding system for providing strobe pulses derived from the clock track in intended phase relationship with the decoded data. A measure of the clock pulse period is continuously derived from the clock track and processed in association with information derived from the data track to produce the intended strobe pulses.

12 Claims, 11 Drawing Figures

FIG. 3a  DATA STREAM  0 1 1 0 0 0 1 0
FIG. 3b  DATA TRACK
FIG. 3c  CLOCK TRACK
FIG. 3d  DATA TRACK
FIG. 3e  CLOCK TRACK
FIG. 3f  $D_{in}(+)$
FIG. 3g  $D_{in}(-)$
FIG. 3h  $D_{out}$
FIG. 3i  $C_{out}$

MAGNETIC RECORDING DATA DECODING SYSTEM

FIELD OF THE INVENTION

This invention relates to magnetic data recording and more particularly to a system for decoding a multitrack data recording having one or more data tracks and a clock track.

BACKGROUND OF THE INVENTION

In the recording of data on magnetic tape or other magnetic storage medium, a separate clock track is often employed in association with one or more data tracks. The clock information should be in predetermined phase relationship with respect to a recorded data track so that the data can be properly decoded and strobe pulses generated for appropriate clocking of the data signal in subsequent signal processing. A phase error between the data and clock tracks can cause erroneous decoding in that the clock pulses are not in correct phase relationship with the data being strobed. Such phase error is usually caused by misalignment of the recording head with respect to the magnetic tape or other recording medium and which may arise from misalignment of the respective head gaps associated with the two tracks or tilting of a multiple head structure with respect to the recorded tracks. The skew may also be of dynamic nature by reason of misalignment between the recorded tracks and the recording head as the recording medium moves past the head. Static skew error is less of a problem if the same recording apparatus is employed for both recording and reproduction; however, if a data recording is recorded on one apparatus and reproduced on another apparatus, the opportunity for greater skew error results. Especially at high bit densities of recorded data sources of skew error can exceed one bit length causing significant decoding errors.

SUMMARY OF THE INVENTION

Briefly, the present invention provides a decoding system for use with a magnetic data recording having one or more data tracks and a clock track wherein clock or strobe pulses are produced in intended phase relationship with the decoded data. A measure of the clock pulse period is continuously derived from the clock track and processed in association with information derived from the data track to produce clock pulses in intended phase relationship with the decoded data irrespective of the phase between the data and clock tracks.

DESCRIPTION OF THE DRAWINGS

The invention will be more fully understood from the following detailed description taken in conjunction with the accompanying drawings, in which:

FIGS. 3a through 3i are waveforms useful in illustrating operation of the invention.

DETAILED DESCRIPTION OF THE INVENTION

The invention is employed in the illustrated embodiment with a two-track magnetic data recording having a data track encoded in a non-return to zero (NRZ) format and an associated clock track encoded with clock pulses in properly phased relationship with the data track. This recording format is itself known in the art. A data stream is illustrated in FIG. 3a, the NRZ recorded representation of which is shown in FIG. 3b and is of the form recorded on the data track of a magnetic tape or other magnetic storage medium. The clock track illustrated in FIG. 3c is recorded on an associated clock track of the magnetic tape or other recording medium, the clock pulse being centered about the data transition times of the data track. When read, data from the two tracks of the recording medium are each differentiated to provide the respective waveforms of FIGS. 3d and 3e. The positive and negative pulses of the differentiated signal of FIG. 3d are respectively processed to provide first and second input data pulses $D_{in}(+)$ and $D_{in}(-)$ as shown in FIG. 3f and FIG. 3g respectively. The readout of data from the data track of the recording medium and the derivation of the data pulses is accomplished in any manner well known in the art.

Figure 1:
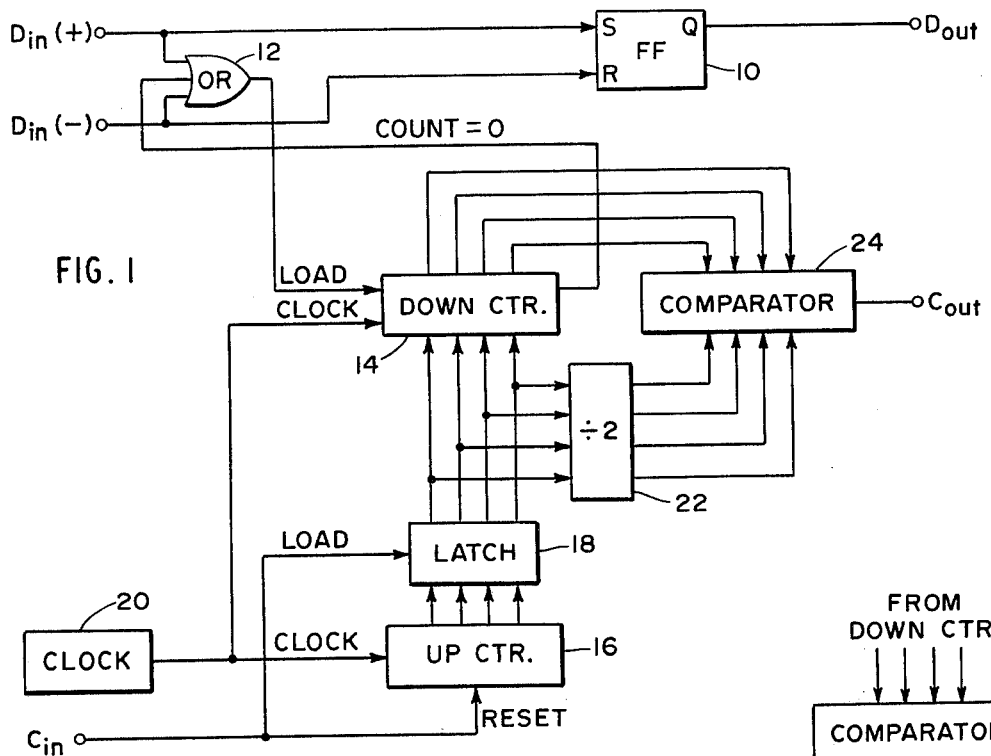
FIG. 1 is a diagrammatic representation of a decoding system according to the invention.

The data pulses of FIGS. 3f and 3g are applied to corresponding inputs of the novel decoding system shown in FIG. 1. The positive input terminal of the system is connected to the set terminal of a flip-flop 10, the reset terminal being connected to the negative input terminal. The Q output of flip-flop 10 provides the decoded data output $D_{out}$ of the system. An OR gate 12 has first and second inputs connected to respective positive and negative input terminals and a third input provided by a presettable down counter 14 when this counter reaches a zero or other predetermined state. The clock signal shown in FIG. 3e is processed to provide single polarity clock pulses which are applied to the clock ($C_{in}$) input which is connected to the reset terminal of an up counter 16 and to the load terminal of a latch 18. The up counter 16 is clocked by a system clock 20 and provides an output count to latch 18. The latch 18 is coupled to down counter 14 and to a divide-by-2 circuit 22, the output of which is applied as one input to a comparator 24. The other input to the comparator 24 is provided by the output of down counter 14. The system clock 20 also provides a clock signal to counter 14 while a load signal for counter 14 is provided by the output from OR gate 12. The output $C_{out}$ (FIG. 3i) of comparator 24 is the clock output which according to the invention is in precise timed relation with the data output $D_{out}$ (FIG. 3h).

The clock pulses provided on the $C_{in}$ terminal are each operative to cause loading of the then count stored in counter 16 into latch 18 and to thereafter reset counter 16. The counter 16 is clocked by the internal system clock 20 which operates at a higher rate than the external clock input derived from the clock track of the recording medium. Thus each clock pulse derived from each transition of the clock track signal causes loading of latch 18 representing the period of the previous two clock pulses.

Upon each data pulse, the down counter 14 is loaded with the then value stored in latch 18. The down counter 14 counts down toward zero and should reach zero one bit time later, when a subsequent data pulse may or may not occur. If a data pulse does occur, the counter 14 is again loaded with the then count of latch 18 and clocked downward toward zero. If no data pulse is received, the counter 14 reaches zero causing provision of a command which is conveyed by OR gate 12 back to the counter 14 to cause reloading thereof with the value then stored in latch 18. The counter 14 is loaded at a rate equal to the frequency of the pulses derived from the clock track but in phase with the pulses derived from the data track. In the absence of data pulses, the counter 14 is recycled automatically in phase with the last received data derived from the data track. As a result, the output clock pulses $C_{out}$ are produced in intended phase with the decoded data even if no data transitions are occurring. In NRZ recording, a string of zeroes or ones on the data track exhibits no transitions. The count stored in latch 18 is processed by divide-by-2 circuit 22 to provide an input to comparator 24 equal to half the value stored in latch 18. When counter 14 counts down to a value equal to the half value from divider 22, comparator 24 provides a $C_{out}$ clock pulse. Thus, the comparator 24 provides output clock pulses $C_{out}$ which have the same period as those derived from the clock track of the recording medium but which are in intended phase relation with the decoded data $D_{out}$ derived from the data track. In practice, the division of the output count from latch 18 can be most efficiently accomplished by a "shift right" operation as is known to those versed in the art.

A clock pulse is produced by the novel decoder which occurs in intended time relationship with the decoded data irrespective of phase errors between the data and clock tracks being decoded and variations in the speed of the recording medium. The system clock 20 is preferably related to the clock rate of the recorded clock track such that counter 16 is clocked to about one-half of the expected clock period to thereby permit correction of tape speed variations and clock pulse phase variations of up to one hundred percent.

Figure 2:
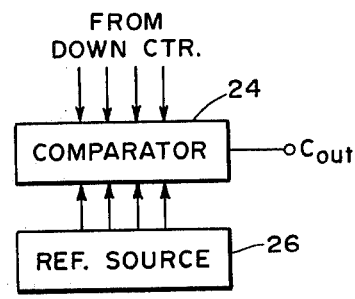
FIG. 2 is a diagrammatic representation of a modification of the embodiment of FIG. 1.

In the embodiment of FIG. 1, the counter 16 is preset in accordance with the previously measured clock period and there is derived therefrom a measure of the midpoint of the measured clock period at which time a clock pulse is regenerated. In alternative embodiment, the counter 14 counts down through a fixed reference value corresponding to the midpoint of the nominal clock period. Referring to FIG. 2, the count from counter 14 is applied to one input of comparator 24 which also receives a reference count from reference source 26 which is a fixed count equal to one-half of the nominal expected clock period. An output $C_{out}$ is provided by comparator 24 when the value received from counter 14 equals the fixed count from reference source 26.

The novel decoding system provides decoding of data and clock information from the respective tracks of a magnetic recording medium in a manner independent of static skew or tape speed errors. The novel system is also immune to dynamic phase jitter provided the phase error does not change at a rate greater than about fifty percent of a bit time per bit, which cannot reasonably occur in actual recording transport apparatus since the degree of error which can occur within a single bit period is limited by the physics of the transport mechanism.

For purposes of illustration in FIG. 1, circuitry is shown of four bit accuracy; in practice, a greater bit accuracy, typically six to eight bits, is employed to achieve intended performance. In an eight bit system using magnetic tape moving at 10 inches per second, such as in the widely employed Philips cassette, and a bit density of 1600 bits/inch, the clock pulses $C_{in}$ are typically 16 KHz in frequency with the system clock being 2.048 MHz. With these parameters, a quantizing error results of approximately one percent which is completely satisfactory in practice. The quantizing error is not cumulative even in the absence of data transitions since a measure of clock period is being continuously updated in accordance with pulses derived from the clock track.

The embodiment described above is employed with a recorded data track having a non-return to zero (NRZ) recording format in association with a separate clock track. The invention is also useful for other types of recording formats such as NRZI recording or other similar multitrack data recording formats in which the decoded data in order to generate appropriate strobing pulses for correct processing of the data.

It will be appreciated that the invention can be variously implemented to provide the novel decoding according to the invention. For example, a system clock can be employed of a first frequency for driving counter 14 and for a second frequency one-half of the first frequency for driving counter 16 in order to define the intended phase relationship between the decoded clock and data information. As a further alternative, the clock track can be decoded so that the $C_{in}$ pulses are only obtained from clock transitions of one polarity and the frequency of counter 16 being one-quarter the frequency of counter 14 to yield the requisite phase relationship. Accordingly, it is not intended to limit the invention by what has been particularly shown and described except as indicated in the appended claims.

What is claimed is:

1. For use in a data recording system having at least one data track and a clock track recorded on a magnetic recording medium, a decoding system comprising:

first means for providing a representation of the clock period derived from said clock track;

second means for providing a representation of said clock period in phase relationship with data derived from said data track;

third means for providing decoded output data from such data track; and fourth means operative in response to said second means for providing output clock pulses in intended phase relationship with said decoded data from said third means.

2. For use in a data recording system having at least one data track and a clock track recorded on a magnetic recording medium, a decoding system comprising:

first means for providing a representation of clock period derived from said clock track;

second means operative upon each clock pulse derived from said clock track to store a representation of a previous clock period;

third means operative in the presence of data pulses derived from said data track to provide a representation of said stored clock period in controllable phase relationship with said data pulse, and subsequently in the absence of data pulses derived from said data track to provide a representation of said stored clock periods in accordance with the phase relationship established by the most recent data pulse;

means for providing decoded output data from said data track; and means operative in response to said third means for providing output clock pulses in intended phase relationship with said decoded output data.

3. A decoding system according to claim 2 wherein said first means includes a counter operative to provide a count representative of said clock period;
and wherein said second means includes a latch circuit coupled to said counter and operative to store a count thereof representing said clock period;
said latch circuit being loaded in response to a clock pulse derived from said clock track and said counter being reset by said clock pulse after loading of said count into said latch circuit.

4. A decoding system according to claim 3 wherein said third means includes:
a presettable counter operative to be preset to a count from said latch circuit; and
gate means coupled to said presettable counter and operative to provide a load command thereto.

5. A decoding system according to claim 4 wherein said means for providing decoded output data includes:
flip-flop means operative in response to data pulses derived from said data track for providing said decoding output data;
and wherein said means for providing output clock pulses includes:
a divider circuit coupled to said latch circuit and operative to provide an output count equal to half the count provided by said latch circuit; and
a comparator circuit coupled to said divider circuit and said presettable counter and operative to provide said output clock pulses upon receipt of a count from said presettable counter equal to the value from said divider circuit.

6. A decoding system according to claim 4 wherein said means for providing decoding output data includes:
flip-flop means operative in response to data pulses derived from said data track for providing said decoding output data;
and wherein said means for providing output clock pulses includes:
means for providing a reference count equal to half of the normal expected clock period; and
a comparator operative to provide said output clock pulses upon receipt of a count from said presettable counter equal to said reference value.

7. For use in a data recording system having at least one data track and a clock track recorded on a magnetic recording medium, a decoding system comprising:
first counter means operative in response to a system clock to store predetermined counts;
latch means operative in response to each clock pulse derived from said clock track to store the then count of said first counter means, the then count being representative of the clock period of the previous two clock pulses;
second counter means operative in response to said system clock to count at a predetermined rate and operative in response to each data pulse derived from said data track to provide a representation of said stored clock period in controllable phase relationship with said stored clock period, and in the absence of a data pulse derived from said data track to provide a representation of said stored clock period in fixed phase relationship with said stored clock period;
means defining a time within said stored clock period at which a clock pulse is intended;
means for providing decoded output data from said data track; and
comparator means for providing an output clock pulse upon coincidence of a representation of said defined time and the period representation from said second counter means.

8. A decoding system according to claim 7 wherein said first counter means includes:
an up counter operative to increment to successively increasing counts in response to said system clock and to be reset in response to each clock pulse derived from said clock track;
and wherein said latch means is operative to receive a load command upon each clock pulse derived from said clock track to cause transfer of the count of said up counter to said latch means prior to resetting of said up counter.

9. A decoding system according to claim 8 wherein said second counter means includes:
a presettable down counter operative upon a load command to be preset with the count stored in said latch means and to decrement in response to said system clock; and
an OR gate operative to provide said load command to said presettable down counter upon receipt of a data pulse derived from said data track or upon receipt of a reference pulse provided by said down counter when said counter reaches a predetermined reference state.

10. A decoding system according to claim 9 wherein said time defining means includes:
a divider circuit operative to provide an output count which is a predetermined fraction of said count from said latch means;
said comparator means providing said output clock pulse upon coincidence of said output count from said divider circuit and an equal count from said down counter.

11. A decoding system according to claim 9 wherein said time defining means includes:
means for providing a reference count equal to a predetermined fraction of a nominal expected clock period;
said comparator means providing said output clock pulse upon coincidence of said reference count and an equal count from said down counter.

12. For use in a data recording system having at least one data track and a clock track recorded on a magnetic recording medium, a decoding system comprising:
first means operative upon each clock pulse derived from said clock track to provide a representation of the period of the previous two clock pulses;
second means for producing a representation of said clock period in phase relationship with data derived from said data track;
third means for providing decoded output data from said data track; and
fourth means operative in response to said second means for providing output clock pulses in intended phase relationship with the decoded data from said third means.

* * * * *